(12) United States Patent
Paduroiu

(10) Patent No.: US 11,245,774 B2
(45) Date of Patent: Feb. 8, 2022

(54) CACHE STORAGE FOR STREAMING DATA

(71) Applicant: EMC IP Holding Company LLC, Hopkinton, MA (US)

(72) Inventor: Andrei Paduroiu, Bellevue, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 16/715,717

(22) Filed: Dec. 16, 2019

(65) Prior Publication Data

US 2021/0185142 A1 Jun. 17, 2021

(51) Int. Cl.
| | |
|---|---|
| *G06F 12/00* | (2006.01) |
| *H04L 29/08* | (2006.01) |
| *G06F 12/1045* | (2016.01) |
| *G06F 12/0891* | (2016.01) |
| *H04L 12/26* | (2006.01) |
| *H04L 29/06* | (2006.01) |
| *G06F 12/0871* | (2016.01) |
| *G06F 12/0888* | (2016.01) |

(52) U.S. Cl.
CPC ...... *H04L 67/2842* (2013.01); *G06F 12/0891* (2013.01); *G06F 12/1045* (2013.01); *H04L 43/0882* (2013.01); *H04L 65/60* (2013.01); *H04L 67/1097* (2013.01); *G06F 12/0871* (2013.01); *G06F 12/0888* (2013.01); *G06F 2212/1024* (2013.01); *G06F 2212/154* (2013.01)

(58) Field of Classification Search
CPC . H04L 67/2842; H04L 43/0882; H04L 65/60; H04L 67/1097; G06F 12/0891; G06F 12/1045; G06F 12/0871; G06F 12/0888; G06F 2212/1024; G06F 2212/154
See application file for complete search history.

(56) References Cited

U.S. PATENT DOCUMENTS

| | | | | |
|---|---|---|---|---|
| 5,530,829 | A * | 6/1996 | Beardsley | G06F 12/0866 711/113 |
| 5,682,419 | A * | 10/1997 | Grube | H04L 27/2608 370/329 |
| 5,787,472 | A * | 7/1998 | Dan | H04N 21/23 348/E5.008 |
| 6,141,731 | A * | 10/2000 | Beardsley | G06F 12/123 711/133 |
| 6,219,772 | B1 * | 4/2001 | Gadangi | G06F 12/023 711/170 |
| 7,472,231 | B1 * | 12/2008 | Cihla | G06F 12/0804 711/144 |

(Continued)

*Primary Examiner* — Shawn X Gu
*Assistant Examiner* — Mohammad S Hasan
(74) *Attorney, Agent, or Firm* — Amin, Turocy & Watson, LLP

(57) ABSTRACT

Described herein are systems and techniques to efficiently cache data for streaming applications. A cache can be organized to include multiple cache segments, and each cache segment can include multiple cache blocks. A cache entry can be created for streaming data, and the streaming data can be streamed directly into a first cache block. When the first cache block is full, a next cache block can be identified, in a same cache segment or in a new cache segment. The streaming data can be streamed directly into the next cache block, and into any further cache blocks as needed.

20 Claims, 10 Drawing Sheets

(56) References Cited

U.S. PATENT DOCUMENTS

| | | | |
|---|---|---|---|
| 7,899,791 B1* | 3/2011 | Gole | G06F 12/0804 |
| | | | 707/654 |
| 8,918,588 B2* | 12/2014 | Bass | G06F 12/121 |
| | | | 711/133 |
| 9,003,110 B2* | 4/2015 | Amit | G06F 3/067 |
| | | | 711/105 |
| 2007/0050535 A1* | 3/2007 | Nelson | G06F 12/0246 |
| | | | 711/103 |
| 2011/0296122 A1* | 12/2011 | Wu | G06F 12/0804 |
| | | | 711/156 |
| 2014/0108731 A1* | 4/2014 | Sardashti | G06F 12/0223 |
| | | | 711/122 |
| 2017/0242794 A1* | 8/2017 | Simionescu | G06F 12/1018 |
| 2017/0315725 A1* | 11/2017 | McKean | G06F 11/2092 |
| 2017/0351615 A1* | 12/2017 | Agombar | G06F 12/0831 |
| 2019/0004974 A1* | 1/2019 | Chhabra | G06F 12/0875 |
| 2019/0065325 A1* | 2/2019 | Anderson | G06F 11/2092 |

\* cited by examiner

CACHE STORAGE FOR STREAMING DATA

TECHNICAL FIELD

The subject disclosure relates generally to electronic data storage systems. More particularly, the subject disclosure relates to caching data for streaming applications.

BACKGROUND

Traditional caches and cache storage techniques present shortcomings in caching data for streaming applications. Traditional caches employ key-value pair Application Programming Interfaces (APIs), where a key (K) is associated with a value (V). Example cache operations may include, for example, put(K,V), get(K), and remove(K). Example traditional cache systems which use key-value pair APIs include Guava, Memcached, Cachelot, and database-backed caching systems built on top of databases such as LevelDB or RocksDB.

For streaming applications, the problems with traditional key-value pair caching systems include, first, key-value pair caching systems require a key for each cache entry, because keys are used to retrieve cache entries. Keys can model offsets in order to store streaming application data, however modeling offsets into key-value pairs introduces inefficiencies. Furthermore, while lookups can potentially be done using offsets, an offset may not map to a key directly. Locating a nearest key is not a feature that key-value pair caches generally provide.

A second problem with key-value pair caching systems for streaming applications is that information (such size information) is generally needed for each cache value. One way to cache streaming application data using key-value pairs is to individually insert every single event into a cache. While this approach does not involve extra copying into memory, it nonetheless presents significant resource overhead. Since events are typically small (the majority are 1-100 bytes), having each event as an individual entry in the cache requires the cache to keep metadata and indexing structures for each event, and the overhead data can easily exceed the size of the data being cached.

Another example approach to cache streaming application data using key-value pairs is to accumulate some data in a memory buffer and then insert it into the cache. This approach can reduce overhead by aggregating entries together, however, it requires allocating new memory for the buffer, copying the data to the buffer (which can take time, depending on the rate at which the data arrives), then inserting the buffer into the cache. This approach therefore involves copying the data twice and waiting for an indeterminate amount of time to fill a buffer.

Another example approach to cache streaming application data using key-value pairs is to read a value from the cache, extend the cache with new data, and then write the data back into the cache. This is referred to as a "read-modify-write" pattern. When a new event is appended, the previous event entry can be located in the cache and, if below a certain size, the previous event entry can be read and copied into a new buffer with an expanded size. The new event can also be copied into the new buffer, after which the buffered data can be written back into the cache. This approach introduces significant write amplification into the system and can potentially overload the cache with an increased number of operations, which can lead to degraded performance. Furthermore, typical caches do not have sufficient information about the entries they store to perform safe eviction of data, nor do typical caches have feedback mechanisms to automatically slow down the ingestion rate of streaming data if they become full or close to full.

The above-described background is merely intended to provide a contextual overview of some current issues and is not intended to be exhaustive. Other contextual information may become further apparent upon review of the following detailed description.

DETAILED DESCRIPTION

Figure 1:
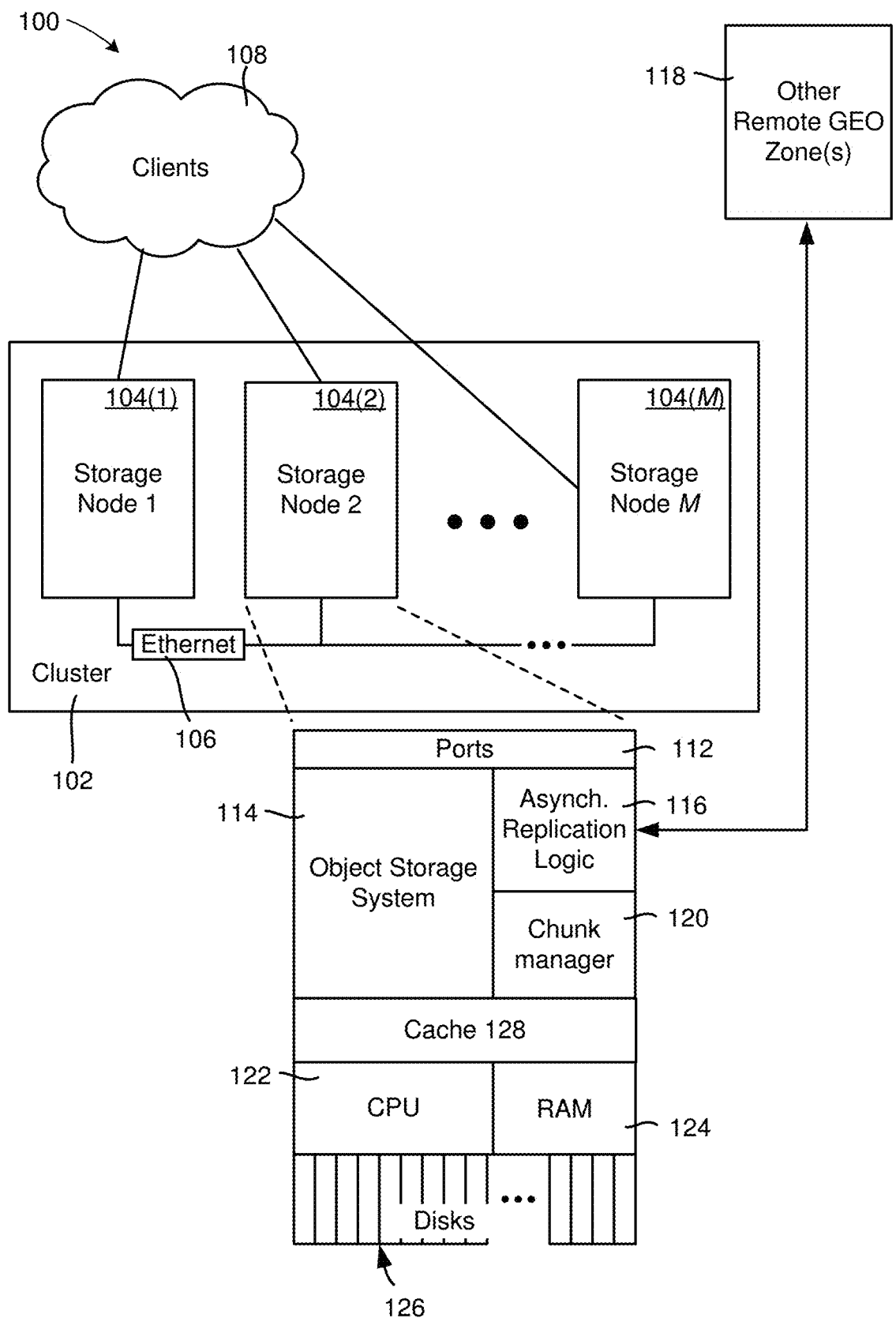
FIG. 1 illustrates an example part of a cloud data storage system, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to efficiently caching data for streaming applications. An example cache can be organized to include multiple cache segments, and each cache segment can include multiple cache blocks. A cache entry can be created for streaming data, and the streaming data can be streamed directly into a first cache block. When the first cache block is full, a next cache block can be identified, whether in a same cache segment or in a new cache segment. The streaming data can be streamed directly into the next cache block, and into any further cache blocks as needed. Metadata can be stored, e.g., in each cache segment, to link cache blocks in which the cache entry is stored. A cache index can also index cache block information corresponding to each cache entry. Further aspects and embodiments of this disclosure are described in detail herein.

Example systems and methods disclosed herein can be included in any computing device that receives streaming application data. In some examples, the technologies described herein can be included in cloud storage systems, such as, but not limited to an ECS™ platform. The ECS™ platform combines the cost advantages of commodity infrastructure with the reliability, availability and serviceability of traditional arrays.

With regard to the ECS™ platform in general, ECS™ can comprise clusters of nodes that deliver scalable public cloud services with the reliability and/or control of a private-cloud infrastructure. Moreover, the ECS™ platform comprises a scale-out, shared-nothing object storage, which employs a microservices architecture pattern. The ECS™ platform can support storage, manipulation, and/or analysis of unstructured data on a massive scale. As an example, ECS™ can support mobile, cloud, big data, content-sharing, and/or social networking applications. ECS™ can be deployed as a turnkey storage appliance or as a software product that can be installed on a set of qualified servers and/or disks.

The ECS™ scale-out and geo-distributed architecture is a cloud platform that can provide the following example features: (i) lower cost than public clouds; (ii) unmatched combination of storage efficiency and data access; (iii) anywhere read/write access with strong consistency that simplifies application development; (iv) no single point of failure to increase availability and performance; and (v) universal accessibility that eliminates storage silos and inefficient extract, transform, load (ETL)/data movement processes; etc.

In an aspect, ECS™ need not rely on a file system for disk capacity management. Instead, ECS™ can partition disk space into a set of blocks of fixed size called chunks (e.g., having a chunk size of 128 MB). User data can be stored in these chunks and the chunks can be shared. Typically, a chunk can comprise fragments of several different user objects. The chunk content can be modified in an append-only mode. When a chunk becomes full, it can be sealed and the content of a sealed chunk is immutable. In a further aspect, a data chunk can comprise a plurality of object segments having a size of 2 MB that are appended in the data chunk. Thus, a data chunk of size 128 MB can have 64 object segments appended together. In general operation, a read request comprises a request to read (e.g., extract) a single object segment.

In another aspect, ECS™ provides a cloud storage system that supports geographically distributed setups comprising two or more zones. Each zone can include a cluster of multiple data node devices which are administered by a cluster controller. The corresponding feature is called GEO. GEO can be used to provide additional protection of user data by means of replication. The replication mechanism can work at the chunks level, although it can also serve object-oriented goals. In an aspect, a chunk with data can be replicated to multiple remote zones. ECS™ can use GEO erasure coding techniques to minimize capacity overhead associated with GEO data protection. Although the systems and methods disclosed herein may be described with respect to object storage systems, the subject specification is not limited to object storage systems and can be utilized for most any storage systems.

The GEO system is capable of employing, e.g., a replication to single site mode, a replication to all sites mode, or a replication to one or more regions mode depending on geographical considerations (e.g., distance and government rules on storing data), site or region storage size considerations (e.g., a site limited to storing 100 million data chunks). A replication to one site mode comprises replicating a backup copy of a data chunk at a single zone. For example, the data chunk is created at a primary zone and a backup is stored at secondary zone. A replication to all sites mode comprises replicating a backup copy of a data chunk at every zone within the GEO system. A replication to one or more regions mode can comprise replicating a data chunk to one or more regions. The data chunk can be replicated at, e.g., a single respective zone of each of multiple respective regions. The advantage of replicating at region level is that it provides greater reliability of accessing the data chunk during zone failure while storing the data chunks at fewer zones, thereby reducing storage resources. In some embodiments, chunks containing data associated with a particular application can be replicated in order to replicate the corresponding objects of the application.

ECS™ supports temporary unavailability of GEO zones. When a zone is temporarily unavailable we say that the zone is in temporary site outage (TSO) mode. Support for TSOs can be accomplished in part through object management. Geographically distributed ECS™ setups maintain a global namespace and assure strong consistency for user data. This is achieved via defining a primary zone for each object. Normally, the primary zone is a zone that created an object. Then, we say that the primary zone owns the object or that the primary zone is the owner of the object. All requests related to the object can be handled by the zone that owns it.

When a zone that owns some object enters TSO mode, a new owner zone can be elected for the object. Note that every available zone of the GEO setup can become the owner. In the general case, a new object owner can facilitate update of the object. This means a potential conflict after the original owner of the object becomes available again. The system runs through a reconciliation phase to resolve conflicts. The ECS's conflict resolution strategy is very simple: choose a latest object update and discard potentially conflicting object updates.

FIG. 1 shows part of a cloud data storage system such as ECS™ comprising a cluster 102 of data node devices, referred to in FIG. 1 as storage nodes 104(1), 104(2) . . . 104(M). The storage nodes 104(1), 104(2) . . . 104(M) can be configured to receive, cache, and otherwise store data, including streaming data, as well as serve stored data in response to requests from clients 108. The nodes 104(1), 104(2) . . . 104(M) can be coupled to each other via a suitable data communications link comprising interfaces and protocols such as, but not limited to, Ethernet block 106.

Clients 108 can send data system-related requests to the cluster 102, which in general can be configured as one large object namespace. There can be on the order of billions of objects maintained in a cluster 102. To this end, a node such as the node 104(2) generally comprises ports 112 by which clients 108 connect to the cloud storage system. Example ports 112 are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), can include an instance of an object storage system 114 and data services. In general, and in one or more implementations, disk space can be partitioned into a set of large blocks of fixed size called chunks and user data can be stored in chunks. Chunks are shared, that is, one chunk can contain segments of multiple user objects; e.g., one chunk can contain mixed segments of some number of (e.g., three) user objects. A chunk manager 120 can be utilized to manage the chunks and their protection.

Each node, such as the node 104(2), can include a CPU 122, RAM 124, cache 128, and storage devices such as disks 126. Cache 128, RAM 124, and disks 126 can comprise, e.g., volatile memory, nonvolatile memory, hard disk drives, solid-state drives or other types of memory devices. Furthermore, cache 128, RAM 124 and disks 126 at multiple of the storage nodes 104(1)-104(M), as well as other storage devices attached to the cluster 102, can be used to collectively support a logical storage which provides a shared storage location for the cluster 102. In some embodiments, cache 128 can be arranged according to the techniques described herein.

For a cluster that comprises a "GEO" zone of a geographically distributed storage system, at least one node, such as the node 104(2), can include or be coupled to reference tracking asynchronous replication logic 116 that synchronizes the cluster 102 with other remote GEO zones, such as 118.

Figure 2:
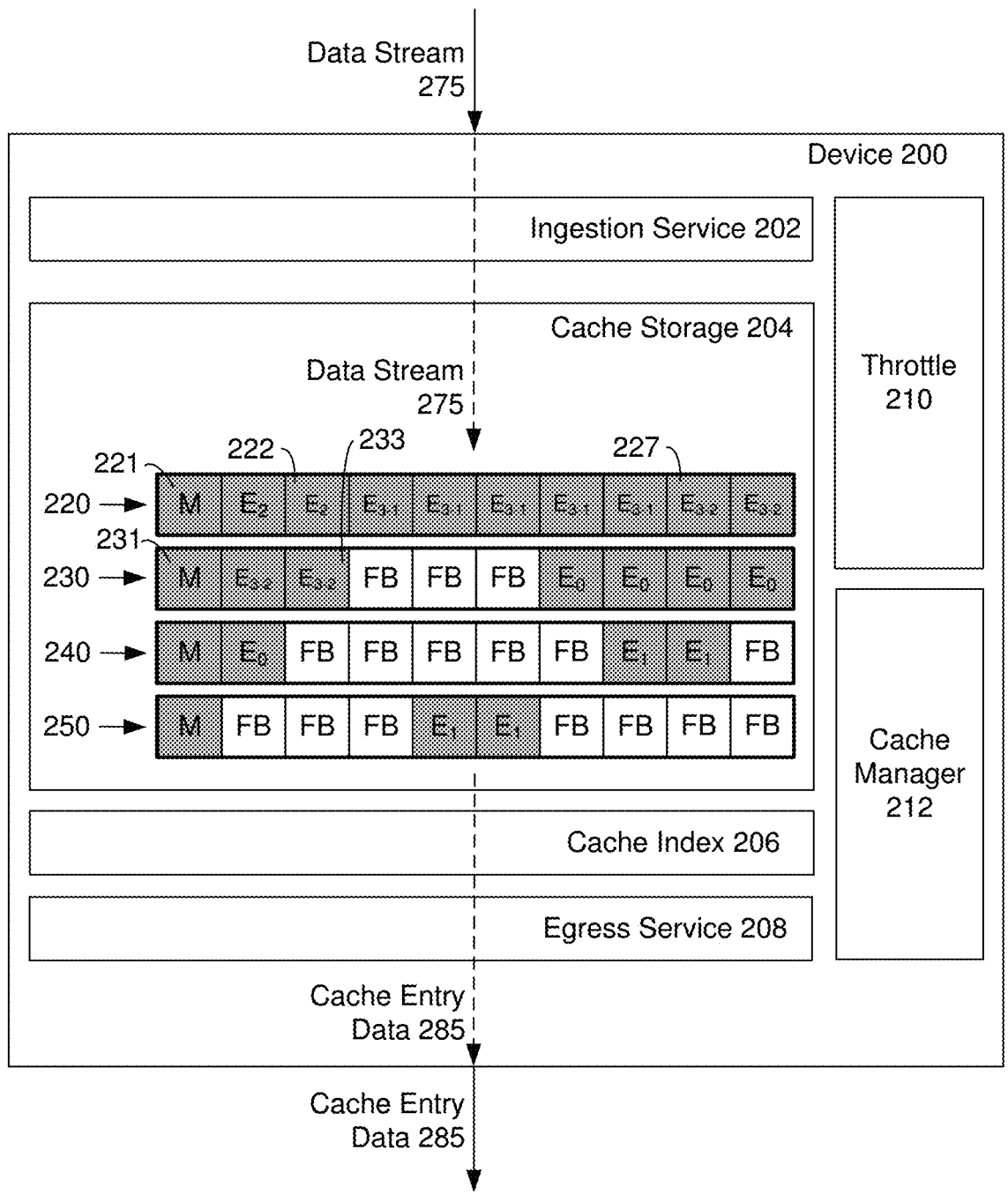
FIG. 2 illustrates an example device comprising a cache storage for streaming data, in accordance with one or more embodiments described herein.

FIG. 2 illustrates an example device comprising a cache storage for streaming data, in accordance with one or more embodiments described herein. FIG. 2 includes example device 200, wherein device 200 comprises an ingestion service 202, a cache storage 204, a cache index 206, an egress service 208, a throttle 210, and a cache manager 212. Device 200 can optionally include numerous additional aspects and features, as will be appreciated. Although not required, in some embodiments device 200 can implement a storage node 104(2) in a cloud data storage system such as illustrated in FIG. 1. Device 200 can also optionally be configured according to FIG. 11, as will be appreciated.

Cache storage 204 comprises multiple example cache segments 220, 230, 240, 250. Each of the cache segments 220, 230, 240, 250 comprises multiple cache blocks, as shown. Some of the cache blocks are designated as metadata blocks M, such as example metadata blocks 221 and 231, some of the cache blocks are illustrated as free cache blocks FB, and some of the cache blocks are illustrated as storing cache entries, including a cache entry $E_0$, a cache entry $E_1$, a cache entry $E_2$, a cache entry $E_{3-1}$, and a cache entry $E_{3-2}$.

Cache entry $E_2$ occupies two cache blocks of cache segment 220, and the last cache block of cache entry $E_2$ is last used cache block 222. Cache entry $E_{3-1}$ begins in a next cache block after last used cache block 222 and cache entry $E_{3-1}$ occupies five cache blocks. Cache entry $E_{3-2}$ begins at cache block 227 and occupies two cache blocks of cache segment 220, and two cache blocks of cache segment 230. Cache entry $E_0$ occupies four cache blocks of cache segment 230, and one cache block of cache segment 240. Cache entry $E_1$ occupies two cache blocks of cache segment 240, and two cache blocks of cache segment 250.

In FIG. 2, a data stream 275 is illustrated as arriving at device 200. The device 200 stores the data stream 275 in the cache storage 204, e.g., as the cache entries $E_{3-1}$ and $E_{3-2}$ in the illustrated cache blocks. The device 200 can store metadata pertaining to the cache entries $E_{3-1}$ and $E_{3-2}$ in the metadata blocks M, and the device 200 can also store index information pertaining to the cache entries $E_{3-1}$ and $E_{3-2}$ in the cache index 206. The egress service 208 can retrieve cache entries, such as cache entries $E_{3-1}$ and $E_{3-2}$, from the cache storage 204, so that device 200 can use the cache entries $E_{3-1}$ and $E_{3-2}$ or provide the cache entries $E_{3-1}$ and $E_{3-2}$ to other devices, as illustrated by the cache entry data arrows 285.

In general, with reference to FIG. 2, the ingestion service 202 can select cache blocks in which to store the cache entries $E_{3-1}$ and $E_{3-2}$. The ingestion service 202 can furthermore write metadata in metadata blocks M, and the ingestion service 202 can write index data in cache index 206, to allow later retrieval of the cache entries $E_{3-1}$ and $E_{3-2}$ by the egress service 208. The egress service 208 can refer to cache index 206 to retrieve cache entries $E_{3-1}$ and $E_{3-2}$, and the egress service 208 can also use metadata blocks M in connection with retrieval of cache entries $E_{3-1}$ and $E_{3-2}$, as will be described herein. The cache manager 212 can be responsible for, inter alia, cleaning up the cache storage 204 by evicting data as desired to free up cache blocks for further cache entries. The throttle 210 can optionally adjust a rate at which ingestion service 202 stores data stream 275 in cache storage 204, and the cache storage rate established by throttle 210 can optionally depend on the available remaining capacity of cache storage 204.

Figure 3:
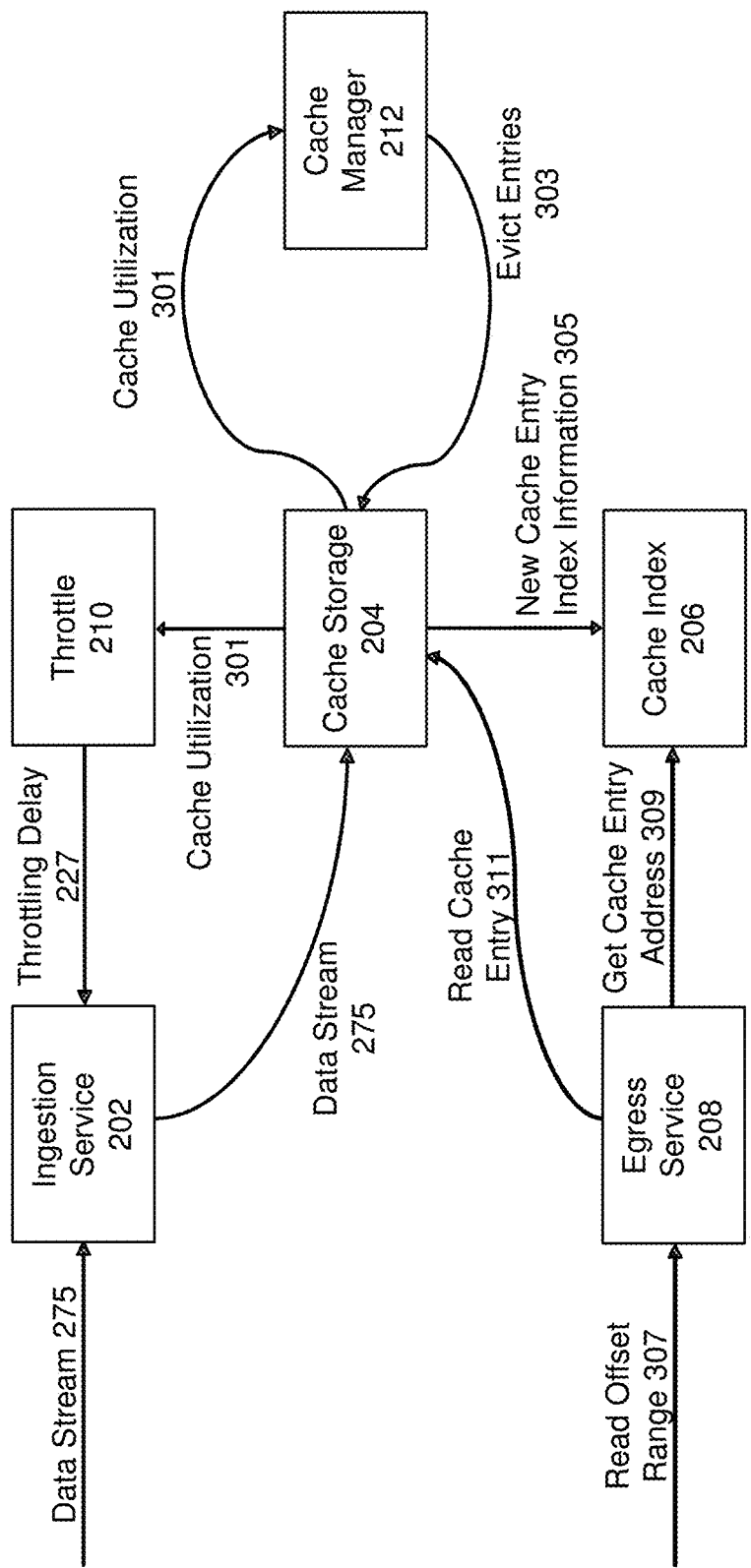
FIG. 3 illustrates example operations of device components introduced in FIG. 2, in accordance with one or more embodiments described herein.

FIG. 3 illustrates example operations of device components introduced in FIG. 2, in accordance with one or more embodiments described herein. FIG. 3 illustrates the ingestion service 202, cache storage 204, cache index 206, egress service 208, throttle 210, and cache manager 212, introduced in FIG. 2.

The illustrated operations include operations to store a data stream 275 in cache storage 204. Data stream 275 can be received at ingestion service 202. Ingestion service 202 can direct data stream 275 to cache storage 204. Data stream 275 can be stored in cache storage 204 as a new cache entry, and new cache entry index information 305 can be stored in cache index 206.

The illustrated operations furthermore include operations to retrieve a cache entry from cache storage 204. Egress service 208 can receive a read offset range 307. Egress service 208 can get a cache entry address 309 from cache index 206. Egress service 208 can then use the cache entry address from operation 309 to read the desired cache entry 311.

The illustrated operations furthermore include operations to evict entries from cache storage 204. When the cache manager 212 identifies that a cache utilization 301 of cache storage 204 is above a target utilization, the cache manager 212 can evict entries 303 from cache storage 204.

The illustrated operations furthermore include operations to throttle a rate at which ingestion service 202 stores data stream 275 in cache storage 204. When the throttle 210 identifies that a cache utilization 301 is above a throttling threshold, the throttle 210 can set a throttling delay 227 for ingestion service 202. In some embodiments, multiple throttling thresholds may be used to progressively increase the throttling delay 227 as the cache utilization 301 increases. Ingestion service 202 can be configured to throttle the cache storage rate of data stream 275 according to throttling delay 227.

Figure 4:
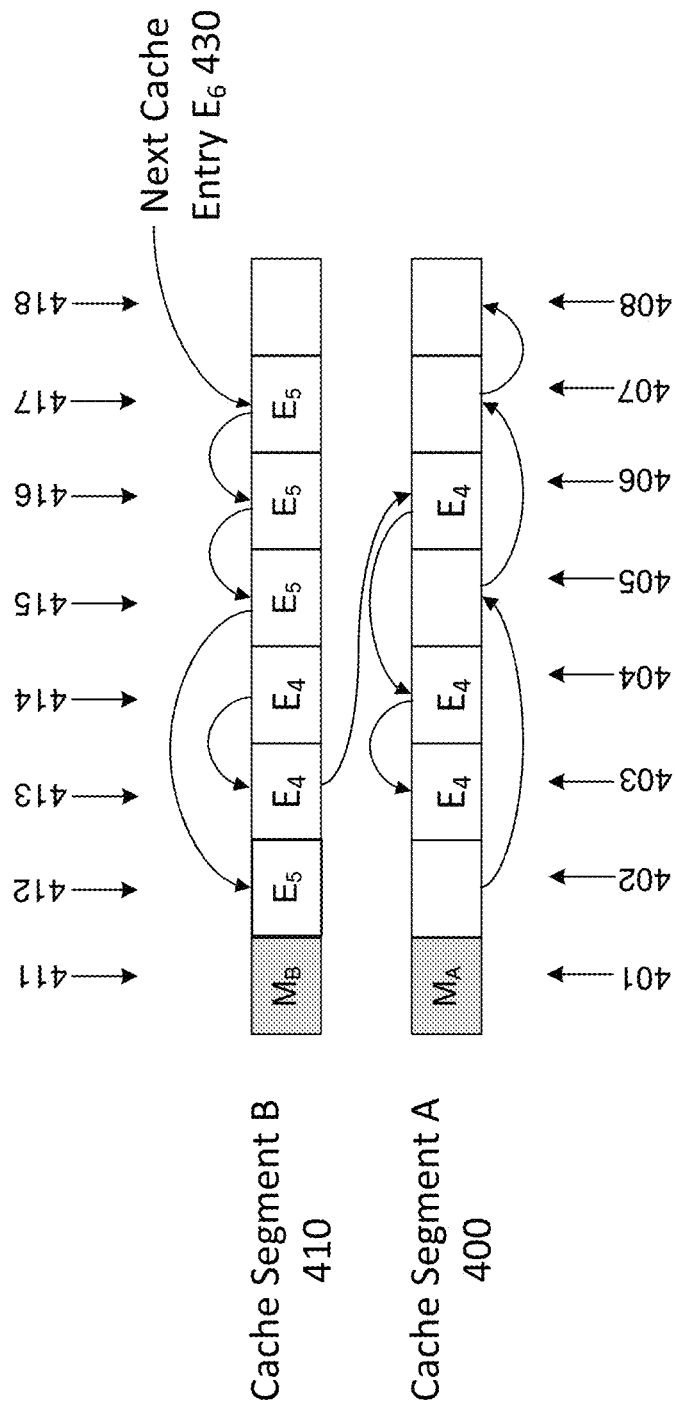
FIG. 4 illustrates example storage of cache entries in cache segments, in accordance with one or more embodiments described herein.

FIG. 4 illustrates example storage of cache entries in cache segments, in accordance with one or more embodiments described herein. FIG. 4 illustrates a cache segment A 400 and a cache segment B 410. Cache segments A and B can for example implement cache segments such as introduced in FIG. 2. In FIG. 4, cache segment A 400 comprises eight cache blocks, including a metadata block $M_A$ 401, and seven cache blocks 402, 403, 404, 405, 406, 407, and 408. Cache segment B 410 also comprises eight cache blocks, including a metadata block $M_B$ 411, and seven cache blocks 412, 413, 414, 415, 416, 417, and 418.

Two cache entries are stored in the illustrated cache segment A 400 and cache segment B 410. A first cache entry $E_4$ is stored in cache blocks 403, 404, 406, 413, and 414. A second cache entry $E_5$ is stored in cache blocks 412, 415, 416, and 417. When storing a next cache entry $E_6$ 430, in some embodiments, the storage of next cache entry $E_6$ 430 can be initiated in a previous, partially full cache block 417, by appending the previous cache entry $E_5$. When the cache block 417 is full, a free cache block (e.g., cache block 418) can be used to continue storing next cache entry $E_6$ 430.

In the illustrated example, cache segment B 410 has one free cache block (cache block 418) in position eight. Cache segment A 400 has four free cache blocks (cache blocks 402, 405, 407, 408). These free cache blocks 402, 405, 407, 408 can be daisy-chained together, e.g., by data in metadata block 401.

Cache entry $E_4$ is split over two cache segments. Storage of cache entry $E_4$ is initiated in cache block 403, followed by cache blocks 404 and 406 in cache segment A 400. After cache block 406, storage of cache entry $E_4$ continues at cache block 413 in cache segment B 410, followed by cache block 414 in cache segment B 410. Metadata for cache entry $E_4$ can be stored in metadata block 401 as well as metadata block 411, to indicate which cache blocks are occupied by cache entry $E_4$ and the sequence of cache blocks for cache entry $E_4$.

Cache entry $E_5$ is stored only in cache segment B 410. Storage of cache entry $E_5$ is initiated in cache block 412, followed by cache blocks 415, 416, and 417. Cache block 417 is not full, so next cache entry $E_6$ 430 can be appended thereto. If nothing else changes, when cache block 417 becomes full, the next free cache block in the same segment, namely cache block 418, can be used.

The cache blocks for any cache entry, e.g., cache entry $E_4$, can optionally be adjacent when possible, but need not be adjacent. Non-adjacent cache blocks for a cache entry can occur, e.g., when other entries in a cache storage are evicted after allocating blocks for a cache entry.

In some embodiments, a first cache block of each cache segment can contain metadata for the remaining cache blocks. Alternatively, any of the cache blocks may be designated as the metadata block. Example metadata in a metadata block is discussed further in connection with FIG. 5.

In another aspect, embodiments can employ a maximum cache entry size. For example, in FIG. 4, a maximum cache entry size of five cache blocks can be established. Any other maximum cache entry size can be used for other embodiments. If a data stream includes more than five cache blocks of data, a new cache entry can be created for the data stream, and cache storage can continue.

Figure 5:
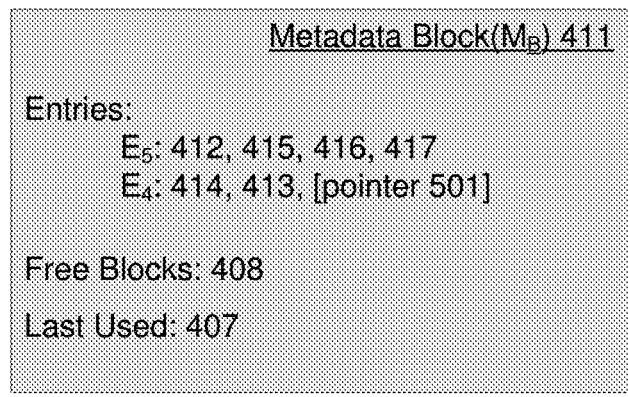
FIG. 5 illustrates an example metadata block, in accordance with one or more embodiments described herein.

FIG. 5 illustrates an example metadata block, in accordance with one or more embodiments described herein. FIG. 5 provides an example detailed view of metadata block 411, introduced in FIG. 4. Metadata block 411 includes metadata for cache segment B 410, as will be understood from FIG. 4.

In general, a metadata block can include cache entry information pertaining to cache entries stored in the cache segment; free cache block information identifying free cache blocks in the cache segment; and, optionally, last used cache block information identifying a last used cache block in the cache segment.

Thus for metadata block 411, the cache entry information identifies the cache blocks used by cache entry $E_5$, and sequence thereof in reverse order, i.e. cache blocks 412, 415, 416, and 417. The cache entry information furthermore identifies the cache blocks used by cache entry $E_4$, and sequence thereof in reverse order, i.e., cache blocks 414 and 413, and the cache entry information includes a pointer 501 to the next cache segment (400) or cache block (406) for cache entry $E_4$.

With further regard to metadata block 411, the free cache block information identifies free cache block 418, the only free cache block in cache segment B 410. The last used cache block information identifies cache block 417. The last used cache block information can be used to identify a cache block in which to append data from a new cache entry. The last used cache block information can optionally be omitted in some embodiments, such as when last used cache block information is instead stored in a cache index.

Figure 6:
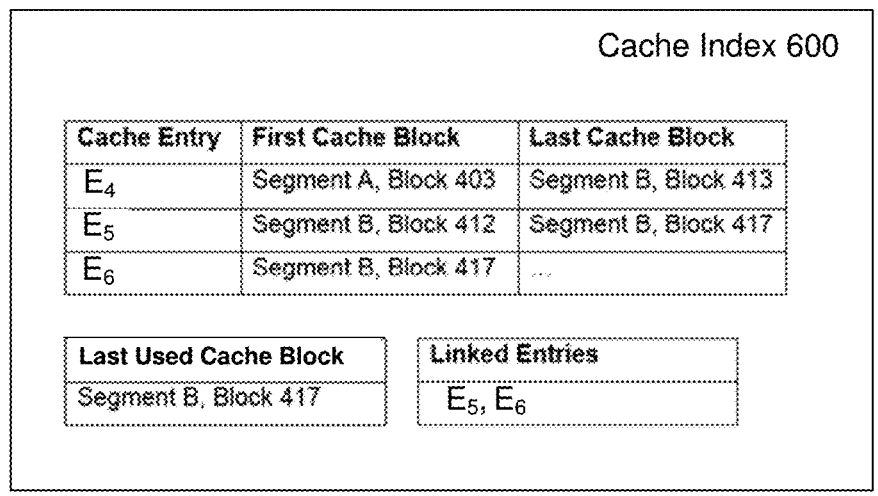
FIG. 6 illustrates an example cache index, in accordance with one or more embodiments described herein.

FIG. 6 illustrates an example cache index, in accordance with one or more embodiments described herein. Example cache index 600 can implement cache index 206, introduced in FIG. 2. In an embodiment, the cache index 600 can map cache entry identifiers to cache segment and cache block identifiers. For example, in some embodiments, a first cache segment and cache block, and a last cache segment and cache block can be identified for each cache entry. The metadata stored in metadata blocks can be used to identify intermediate cache blocks for any cache entry.

Furthermore, the cache index 600 can optionally identify a last used cache block, for use in initiating storage of a new cache entry, and the cache index 600 can optionally identify any linked cache entries.

The data populating cache index 600 is based on the example introduced in FIG. 4. The first cache block for cache entry $E_4$ is at segment A, block 403, and the last cache block for cache entry $E_4$ is at segment B, block 414. The first cache block for cache entry $E_5$ is at segment B, block 412, and the last cache block for cache entry $E_5$ is at segment B, block 417. The first cache block for cache entry $E_6$ is at segment B, block 417, and the last cache block for cache entry $E_6$ is not yet established. The last used cache block, for reference when appending new entries, is at segment B, block 417. Cache entries $E_5$ and $E_6$ are designated as linked cache entries, indicating that both cache entries correspond to a same data stream, and so both cache entries can be read in order to retrieve all data corresponding to a stored data stream.

Figure 7:
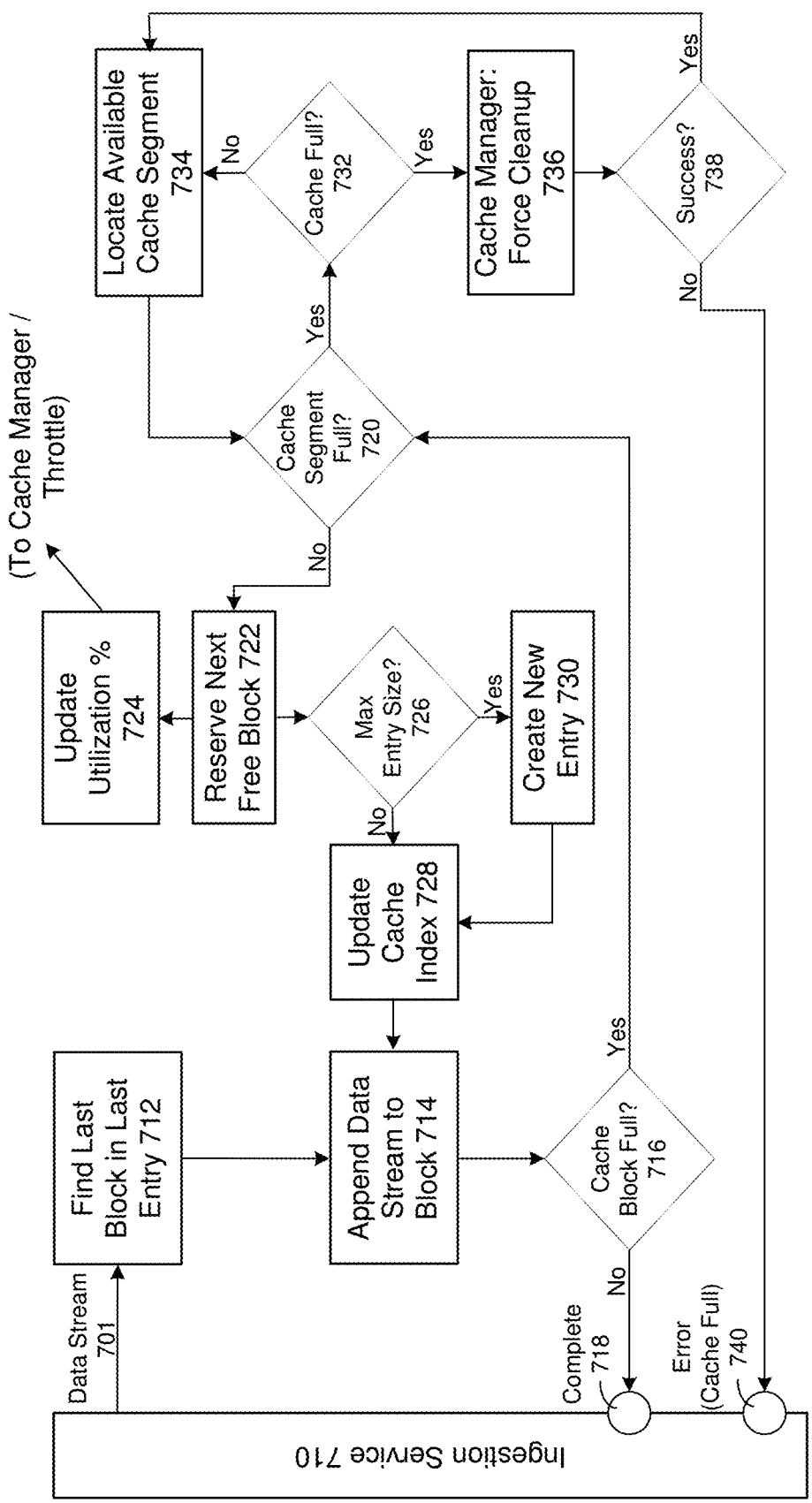
FIG. 7 is a schematic diagram illustrating example operations to store a data stream in a cache, in accordance with one or more embodiments described herein.

FIG. 7 is a schematic diagram illustrating example operations to store a data stream in a cache, in accordance with one or more embodiments described herein. FIG. 7 comprises an example ingestion service 710. Ingestion service 710 can optionally implement the ingestion service 202 introduced in FIG. 2. In the illustrated example, the various operations illustrated in FIG. 7 can generally be performed by ingestion service 710, with the exception of blocks 736 and 738, which can be performed by a cache manager.

As illustrated in FIG. 7, the ingestion service 710 can store a data stream 701 in a cache storage by performing the illustrated operations. At "find last block in last entry" 712, ingestion service 710 can for example find a last cache block which is partially filled by a previous cache entry. In some instances, the last cache block may be substantially full, in which case the ingestion service 710 can proceed to operation 716. Also, in the case of an empty cache with no previous cache entries, the ingestion service 710 can find any free cache block, such as a first cache block in a first cache segment. Ingestion service 710 can create a cache entry in a cache index for data stream 701 by storing, in the cache index, an identifier for the cache entry and corresponding cache address information, such as illustrated in FIG. 6. Initially, the cache block identified at 712 can optionally be included in the cache index as both the first cache block and the last cache block of the cache entry.

At "append data stream to block" 714, ingestion service 710 can write the data stream 701 into the current cache block identified at operation 712. Ingestion service 710 can also update the metadata block for the corresponding cache segment. Ingestion service 710 can update cache entry information, free block information, and last use block information in a metadata block such as illustrated in FIG. 5, to accurately reflect changes due to storage of a new cache entry in a cache block.

At "cache block full?" 716, if the ingestion service 710 is done writing data stream 701 into the current cache block, however the identified cache block is not full, then the storage of the data stream 701 can be complete 718. Alternatively, if at 716 the ingestion service 710 is not done writing data stream 701 into the current cache block, however the current cache block is full, then the ingestion service can move to "cache segment full?" 720.

At "cache segment full?" 720, ingestion service 710 can determine, e.g., from cache segment metadata, whether there are any free cache blocks in a current cache segment, namely, a cache segment comprising the current cache block. If there are additional free cache blocks in the current cache segment, then ingestion service 710 can move to "reserve next free block" 722 in order to continue writing the data stream 701 into additional cache blocks of the current cache segment.

If there are not additional free cache blocks in the current cache segment, then ingestion service 710 can move to "cache full?" 732, and, when the cache is not full, the ingestion service 710 can proceed to "locate available cache segment" 734, in order to locate a cache segment including free cache blocks in which to continue writing the data stream 701. The available cache segment located at 734 becomes the current cache segment, and the ingestion service 710 returns to 720.

Any of a variety of approaches can be used to locate an available cache segment at operation 734. In one example, the ingestion service 710 can attempt to locate adjacent or nearby cache segments, e.g., by finding a next available cache segment in a sequence of cache segments. In another example, the ingestion service 710 can randomly jump to any available cache segment. In another example, the ingestion service 710 can apply a last recently used (LRU) approach, by looking for most recently used cache segments which also contain free cache blocks.

At "reserve next free block" 722, ingestion service 710 can reserve a next free cache block of a current cache segment. Ingestion service 710 can identify a next free cache block from free cache block information in a cache segment metadata block, e.g., a metadata block such as illustrated in FIG. 6. The reserved next free cache block becomes the current cache block.

Each time a next free block is reserved at 722, ingestion service 710 can also "update utilization %" 724, for example by notifying a cache manager or throttle of a new cache utilization measurement. The cache utilization measurement can take the form of a percent of a cache which is full or empty, a ratio of full to empty cache blocks, a total number of free cache blocks, a total number of full cache blocks, or another cache measurement number indicative of the free storage remaining in the cache storage, as will be appreciated.

At "max entry size?" 726, ingestion service 710 can determine whether a total cache entry size, optionally spanning multiple cache blocks, of a cache entry corresponding to data stream 701 has reached any maximum size limit. A size limit may be expressed, for example, as a number of cache blocks permitted to be occupied by a cache entry. If a cache entry has reached the size limit, then the ingestion service 710 can "create new cache entry" 730.

At "update cache index" 728, ingestion service 710 can update a cache index, such as illustrated in FIG. 6. When a new cache entry is created at 730, the cache index can be updated by including a new cache entry identifier, first cache block and last cache block addresses for the new cache entry (these addresses can optionally both identify the cache block reserved at 722), and updated linked entries information. When a same cache entry is continued, rather than creating a new cache entry at 730, the cache index can be updated by including a new last cache block address for the cache entry, wherein the last cache block address is the address of the cache block reserved at 722. The last used cache block information can also be updated in the cache index. The ingestion service 710 can then continue to "append data stream to block" 714 by storing data stream 701 in the current cache block, i.e., the block reserved at 722.

Returning to "cache full" 732, when the cache storage is full, the cache manager can be notified, and the cache manager can perform "cache manager: force cleanup" 736. The cache manager can identify cache entries for eviction from the cache storage, e.g., one or more old cache entries, or one or more cache entries that have been copied to other storage locations, or cache entries identified using any cleanup technique. The cache manager can then evict the identified cache entries from the cache, e.g., by removing these cache entries from the cache index and changing cache segment metadata to indicate that cache blocks occupied by evicted cache entry are now free cache blocks. If cache cleanup at 736 is a success, the cache manager can notify the ingestion service 710 to return to 734. If cache cleanup at 736 is not a success, then the cache manager may flag a cache full error 740, and storage of the data stream 701 can be paused until the error is resolved.

Figure 8:
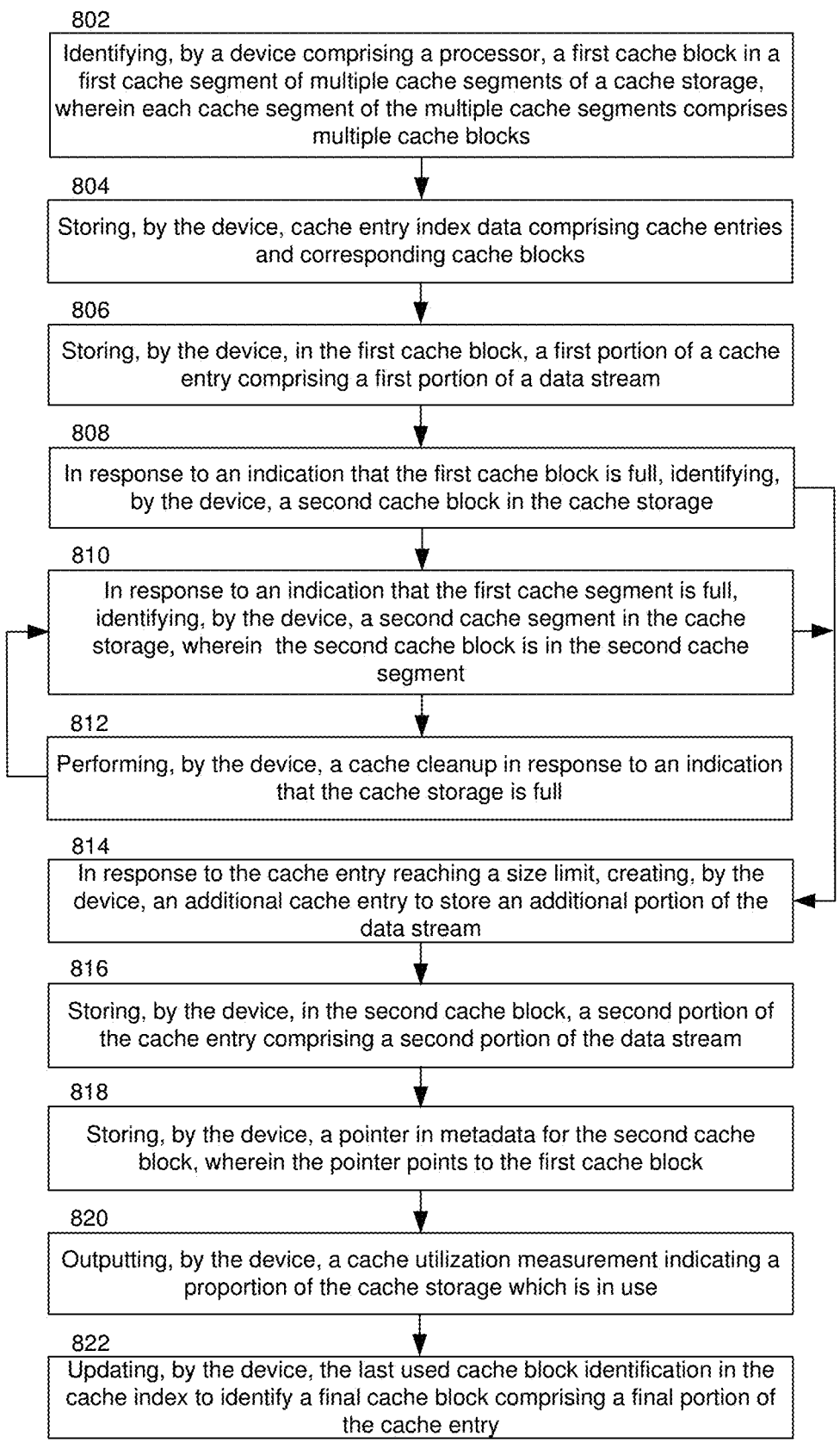
FIG. 8 is a flow diagram of a first example, non-limiting computer implemented method to store a data stream in a cache, in accordance with one or more embodiments described herein.

FIG. 8 is a flow diagram of a first example, non-limiting computer implemented method to store a data stream in a cache, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by a device 200 such as illustrated in FIG. 2. At 802, the device 200 can identify a first cache block in a first cache segment of multiple cache segments of a cache storage, wherein each cache segment of the multiple cache segments comprises multiple cache blocks. For example, the device 200 can identify a first cache block after the last used cache block 222 in a first cache segment 220 of multiple cache segments 220, 230, 240, 250 of a cache storage 204, wherein each cache segment of the multiple cache segments 220, 230, 240, 250 comprises multiple cache blocks. The multiple cache segments 220, 230, 240, 250 can be equal sized and the multiple cache blocks can also be equal sized. For example, in an embodiment, the cache segments 220, 230, 240, 250 can be two megabytes, and the cache blocks can be four kilobytes. It will be appreciated that other sizes are also feasible.

At 804, the device 200 can store cache entry index data comprising cache entries and corresponding cache blocks. For example, the device 200 can create cache entry $E_{3-1}$ and store an identifier therefor in cache index 206, along with corresponding cache address information including cache segment identifier(s) and cache block identifier(s) at which the cache entry $E_{3-1}$ is stored.

At 806, the device 200 can store, in the first cache block, a first portion of a cache entry comprising a first portion of a data stream. For example, the device 200 can store a first portion of a cache entry $E_{3-1}$ comprising a first portion of a data stream 275 in the illustrated cache block of cache segment 220.

At 808, in response to an indication that the first cache block is full, the device 200 can identify a second cache block in the cache storage. For example, if the first cache block becomes full, and if free cache blocks are available in cache segment 220, then device 200 can identify a second cache block for cache entry $E_{3-1}$ in cache segment 220 of the cache storage 204, and the method can continue to operation 814. If free cache blocks are not available in cache segment 220, the method can continue to operation 810.

At 810, in response to an indication that the first cache segment is full, the device 200 can identify a second cache segment in the cache storage, wherein the second cache block is in the second cache segment. For example, in response to an indication that the first cache segment 220 is full, the device 200 can identify a second cache segment 230 in the cache storage 204 for cache entry $E_{3-2}$, and a second or other subsequent cache block for storing cache entry $E_{3-2}$ can be in cache segment 230. After a second cache block is identified in cache segment 230, the method can continue to operation 814.

At 812, the device 200 can perform a cache cleanup in response to an indication that the cache storage is full. For example, when the cache segments 220, 230, 240, 250 are full, the cache manager 212 can force a cleanup to evict cache entries and free some of the cache blocks. After cache blocks are freed, the method can then return to finding a second or other subsequent cache block for the data stream 275 at operation 810.

At 814, in response to the cache entry reaching a size limit, the device 200 can create an additional cache entry to store an additional portion of the data stream. For example, if the cache entry $E_{3-1}$ reaches a size limit of, e.g., five cache blocks, the device 200 can create an additional cache entry $E_{3-2}$ to store an additional portion of the data stream 275 in additional free blocks of cache storage 204. If the cache entry $E_{3-1}$ has not yet reached the size limit, then operation 814 can be skipped to proceed to operation 816.

At 816, the device 200 can store, in the second cache block, a second portion of the cache entry comprising a second portion of the data stream. For example, the device 200 can store, in a second cache block identified at operation 808 or 810, a second or other subsequent portion of the cache entry $E_{3-1}$ (or $E_{3-2}$) comprising a second or other subsequent portion of the data stream 275. When a new cache entry $E_{3-2}$ is created at operation 814, the next portion of the data stream 275 is instead stored in the new cache entry $E_{3-2}$.

At 818, the device 200 can store a pointer in metadata for the second cache block, wherein the pointer points to the first cache block. For example, the device 200 can store a pointer in a metadata block 231 of a cache segment 230, wherein the pointer points to a first cache block, or otherwise, an immediate previous cache block, in cache segment 220.

At 820, the device 200 can output a cache utilization measurement indicating a proportion of the cache storage which is in use. For example, the device 200 can output a cache utilization measurement indicating the proportion of gray blocks to white FB blocks in the cache storage 204. The output may be internal from one component to another within device 200, e.g., from cache storage 205 to throttle 210.

At 822, the device 200 can update the last used cache block identification in the cache index to identify a final cache block comprising a final portion of the cache entry. For example, the device 200 can update the last used cache block identification in the cache index 206 to identify a final cache block 233 comprising a final portion of the cache entry $E_{3-2}$. To store a subsequent data stream in cache storage 204, the device 200 can identify a first cache block in the cache storage 204 for the subsequent data stream by checking cache index 206 for a last used cache block identification, as last used cache block 222 was used as the starting point for cache entry $E_{3-1}$.

Figure 9:
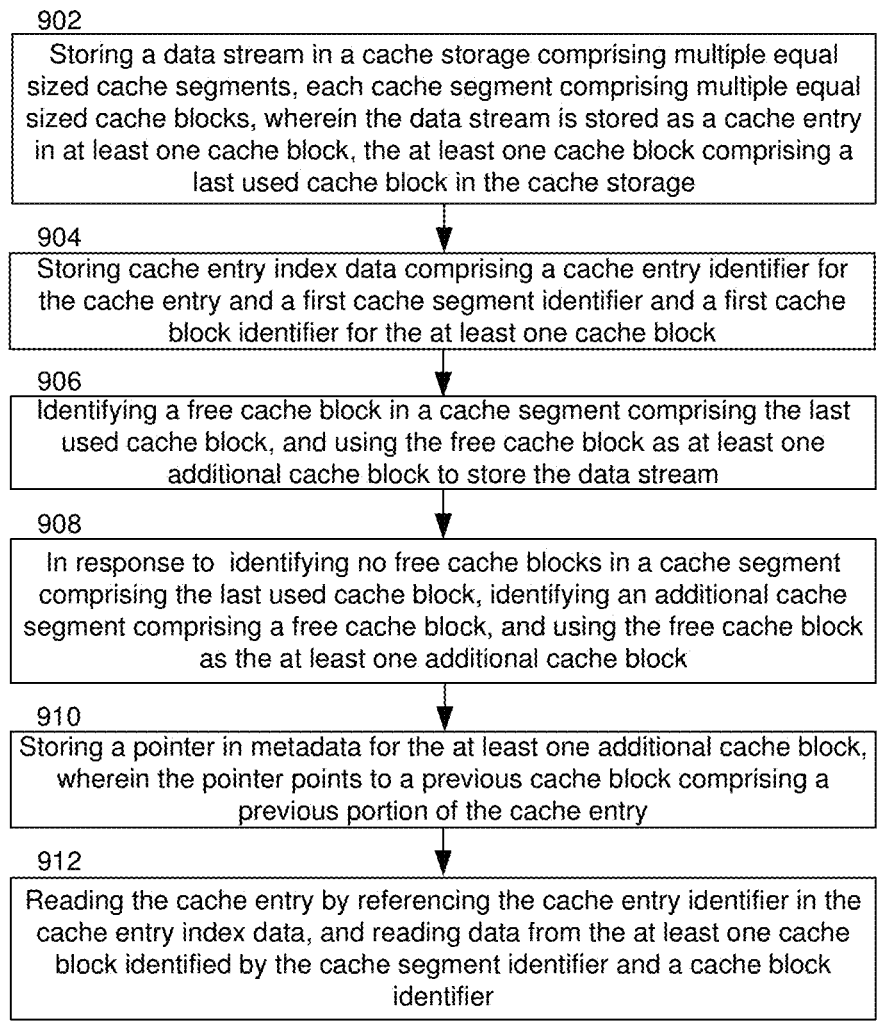
FIG. 9 is a flow diagram of a second example, non-limiting computer implemented method to store a data stream in a cache, in accordance with one or more embodiments described herein.

FIG. 9 is a flow diagram of a second example, non-limiting computer implemented method to store a data stream in a cache, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by a device 200 such as illustrated in FIG. 2. At 902, the device 200 can store a data stream 275 in a cache storage 204 comprising multiple equal sized cache segments 220, 230, 240, 250, each cache segment 220, 230, 240, 250 comprising multiple equal sized cache blocks, wherein the data stream 275 is stored as a cache entry $E_{3-1}$ in at least one cache block. The at least one cache block can comprise a last used cache block 222 in the cache storage 204, or for example a cache block following the last used cache block 222. The at least one cache block for cache entry $E_{3-1}$ can further comprise at least one additional cache block in the cache storage 204, in addition to, e.g., the last used cache block 222, or other cache block in the cache storage 204 containing a first portion of the data stream 275. For example, in FIG. 2, the cache entry $E_{3-1}$ for data stream 275 is stored in five cache blocks, and another cache entry $E_{3-2}$, is created to store another portion of data stream 275.

At 904, the device 200 can store cache entry index data in cache index 206, the cache entry index data comprising a cache entry identifier for the cache entry, a first cache segment identifier (e.g., for cache segment 220), and a first cache block identifier (e.g., for cache block 222). The cache entry index data can further comprise a final cache segment identifier (e.g., for cache segment 220) and a final cache block identifier for a final cache block of the cache entry $E_{3-1}$.

At 906, the device 200 can identify a free cache block in a cache segment 220 comprising the last used cache block 222, and the device 200 can use the free cache block as at least one additional cache block to store the data stream 275. At 908, in response to identifying, at operation 906, no free cache blocks in a cache segment 220 comprising the last used cache block 222, the device 200 can identify an additional cache segment 230 comprising a free cache block, and the device 200 can use the free cache block in cache segment 230 as at least one additional cache block to store the data stream 275.

At 910, the device 200 can store a pointer in metadata for the at least one additional cache block, wherein the pointer points to a previous cache block comprising a previous portion of the cache entry. For example, the device 200 can store a pointer in a metadata block 231 for the at least one additional cache block storing cache entry $E_{3\text{-}2}$ in cache segment 230, wherein the pointer points to a previous cache block (in this example, the final cache block in cache segment 220), the previous cache block comprising a previous portion of the cache entry $E_{3\text{-}2}$.

At 912, the device 200 can read the cache entry, or cache entries, by referencing the cache entry identifier in the cache entry index data stored in cache index 206, and the device 200 can read data from the at least one cache block identified (in the cache index 206) by the cache segment identifier and cache block identifier.

Figure 10:
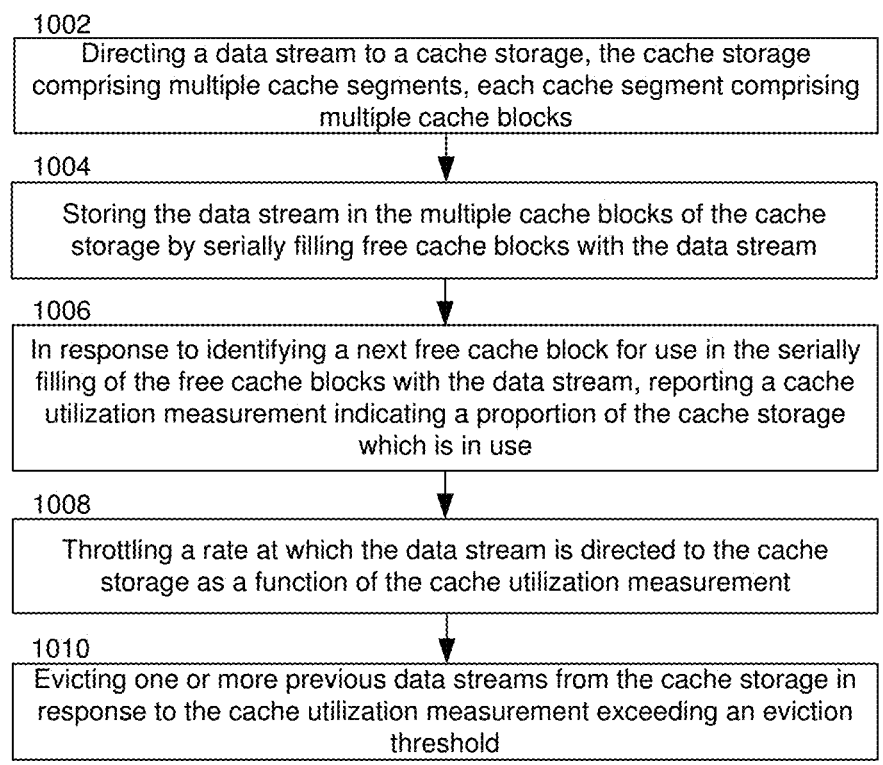
FIG. 10 is a flow diagram of a third example, non-limiting computer implemented method to store a data stream in a cache, in accordance with one or more embodiments described herein.

FIG. 10 is a flow diagram of a third example, non-limiting computer implemented method to store a data stream in a cache, in accordance with one or more embodiments described herein. The blocks of the illustrated method represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 10 can be performed by a device 200 such as illustrated in FIG. 2. At 1002, the device 200 can direct a data stream 275 to a cache storage 204, the cache storage comprising multiple cache segments 220, 230, 240, 250, each cache segment 220, 230, 240, 250 comprising multiple cache blocks.

At 1004, the device 200 can store the data stream 275 in the multiple cache blocks of the cache storage 204 by serially filling free cache blocks with the data stream 275. The data stream 275 can be stored as at least one cache entry $E_{3\text{-}1}$ in the multiple cache blocks of the cache storage 204. In an embodiment, the storing the data stream 275 in the multiple cache blocks of the cache storage 204 by the serially filling of the free cache blocks with the data stream 275 can comprise serially filling of the free cache blocks of each respective cache segment 220, 230, 240, 250 of the multiple cache segments 220, 230, 240, 250.

At 1006, in response to identifying a next free cache block for use in the serially filling of the free cache blocks with the data stream 275, the device 200 can report a cache utilization measurement, e.g., from cache storage 204 to throttle 210, the cache utilization measurement indicating a proportion of the cache storage 204 which is in use.

At 1008, the device 200 can throttle a rate at which the data stream 275 is directed to the cache storage 204 as a function of the cache utilization measurement. In an embodiment, throttling the rate at which the data stream 275 is directed to the cache storage 204 as a function of the cache utilization measurement can comprise setting a throttling delay when the cache utilization measurement is above a throttling threshold.

At 1010, the device 200 can evict one or more previous data streams from the cache storage 204 in response to the cache utilization measurement exceeding an eviction threshold. For example, cache manager 212 can evict a previous data stream by evicting cache entry $E_0$.

The streaming cache disclosed herein overcomes difficulties of traditional key-value pair caches by organizing the cache differently: Instead of a key-value pair structure, the disclosed cache can be organized in equal-sized cache blocks (grouped, for efficiency, in larger cache segments). Cache entries need not be represented by a key, but rather by a cache address which uniquely identifies a cache segment and a cache block within the cache segment. As such, given a cache address, the data for a cache entry can be located in $O(1)$ time, which enables substantially immediate retrieval or appending to a cache entry. Furthermore, cache entries can be modified (appended to) since we have a pointer to the last cache entry. Embodiments can continue writing to the last cache block or find new cache blocks ($O(1)$), all while the existing data need not be touched.

Because the disclosed cache has an integrated mechanism that keeps track of its utilization, upstream code can be wired into it to enable flow control. The upstream code can also supply a policy that indicates which entries can be evicted from the cache, as there may be rules about unevictable entries or other user-supplied retention policies to be considered.

In an aspect, this disclosure provides a method for efficiently caching data for streaming applications that enables direct modifications without the need for extra buffers or the use of time-consuming read-modify-write patterns. In streaming applications, data are made up of discrete events that are very small in size (typically less than 100 bytes); such events form a sequence that is generated by one or more producers and read by one or more consumers. A streaming platform can treat these events as an incoming stream of data (arriving continuously or in small batches) and can append them to the end of a file. The contents of a file become immutable once written, but can be accessed randomly based on offset. Typically the data are read immediately after being written, or a short while afterwards, and since most streaming applications are time-sensitive, this data can be cached in the platform itself so that they may be quickly accessed without delay.

In this disclosure, a caching method optimized for streaming applications is presented. Incoming data can be streamed directly into the cache, which organizes it internally, breaking it down into equal-sized cache entries and using feedback loops to enable the upstream code to perform flow control. This results in $O(1)$ inserts, appends, removals and retrievals, with the time used by the CPU being the actual writing/reading of data into or out of the cache.

An example context in which the teachings of this disclosure can be applied is when a streaming application is to append data to a file or object. Appended data comes in the form of a data stream, namely, a continuous stream of bytes or a sequence of small chunks of bytes, such as 100 bytes at a time. While data can only be appended, arbitrary-offset reads can be supported. Each byte in the file is uniquely addressable by its offset. Reads can be initiated at an arbitrary offset and can specify a length.

As illustrated in FIG. 2, components of a device equipped according to this disclosure include a cache storage which stores data in memory for quick access; a cache manager which can manage cache storage size; and a cache index which can index data in cache storage into cache entries mapped at various offsets within a file. Further components include a cache throttle which can slow down data ingress based on various criteria; and an ingestion service which can handle all the logic of receiving a data stream for a file as well as handle the durable persistence of data and storing data in the cache for quick access. The ingestion service can furthermore wire together all the aforementioned cache components.

In an example cache organization, a cache storage can be divided into equal-sized cache segments. A Cache Segment can comprise a contiguous area of memory, and can be divided into equal-sized cache blocks. A first cache block in each cache segment can store metadata about each of the other cache blocks in the cache segment. Such metadata may include information about free/used cache blocks, the previous/next cache block in a sequence, and the amount of data stored in a cache block.

The remaining cache blocks (other than the metadata block) can store data. Free cache blocks can be daisy-chained together (a free cache block can have a pointer to the next free block in its cache segment). This helps locate empty cache blocks in $O(1)$ time.

In an embodiment, a cache entry can include a list of cache blocks, in order, that, when concatenated, form a sequence of bytes that can be mapped to a portion of the file. Cache entries can have an address that can be used to retrieve or remove them. This address can uniquely identify the cache segment and the cache block that contains either the first or the last byte of the cache entry. For efficiency reasons, it is recommended to point to the last cache block. Cache entries can either be written as a whole by the upstream code, in which case the length of the cache entry is known prior to inserting it; or streamed in, in which case the length of the cache entry need not be known prior to inserting it.

In an example set of operations to insert or append data into the disclosed cache, an ingestion service can receive one or more data streams for an arbitrary number of targets. The ingestion service can optionally persist the data. The ingestion service can also stream data directly into the cache storage disclosed herein, without the use of other buffers.

As the cache receives data and fills up cache blocks it can notify the cache index of such cache blocks becoming filled. The cache index can define the size of a cache entry as a multiple of the size of a cache block. For example, if a cache block is 4 KB, a cache entry can be 4 KB, 8 KB, 16 KB, etc.).

When streaming data to a cache entry, the cache can locate a last block for that entry. If a new entry, the cache can find a free cache block to use. The cache can append to the last cache block in that entry. When the last cache block in an entry is filled up, the cache can locate a next cache block to use. If more blocks cannot be added to an entry because of max size limits, the cache index can be notified of the address of the last block in the cache entry and a new entry can be created.

In some embodiments, the cache index can store a mapping of file offsets to cache entry addresses. Each offset can map to the address of the entry that stores data beginning at that offset. Embodiments can optionally store this in a sorted manner, for example using a sorted list or balanced binary search tree. When a notification is received, a new mapping can be inserted to record the entry's address and its corresponding file offset.

With regard to controlling insert/append tasks, a cache utilization can be defined as number of bytes stored in a cache divided by a maximum size of the cache. Cache utilization can optionally expressed as a percentage. Throttling thresholds (minimum and maximum) can be defined as cache utilizations at which throttling begins (the minimum threshold) and at which throttling reaches maximum value (the maximum threshold). A target utilization can be defined as a cache utilization targeted by the cache manager.

In an example embodiment, 0%<TargetUtilization< MinThrottlingThreshold<MaxThrottlingThreshold<100%. If cache utilization exceeds MinThrottlingThreshold, the throttle can calculate a delay based on cache utilization, and notify the ingestion service to introduce that delay in processing data. Delays can be gradual and calculated based on the cache utilization of the cache. For example, no delay under MinThrottlingThreshold, but full delay at MaxThrottlingThreshold.

If the cache utilization is 100%, the cache can halt insert/append activities and notify the cache manager to apply a cache eviction policy. If the cache manager is able to evict data, appends/inserts can be released and may proceed. Otherwise, an error can be raised and it can be up to the ingestion service to handle it. On a periodic basis, the cache manager can inspect the cache and, if cache utilization exceeds a target utilization, the cache manager can apply an eviction policy to clear unneeded entries. Eviction can optionally be done based on a custom policy. For example, a last recently used (LRU) cache can keep the most recently used pieces of data and evict the pieces of data that haven't been used recently.

In an example set of read operations, the ingestion service can receives a read request for data in a file at offset 0 of Length L. A lookup in the cache index can be performed and an <Entry.Offset, Entry.Address> pair can be located such that Entry.Offset is minimal and Entry.Offset<=O. If nothing is located, or if the located entry does not overlap (0, O+L), then additional steps may be taken to reinsert data into the cache. This can be handled by an external actor, but the process can be similar, if not identical to the operations described herein to insert or append data into the disclosed cache. The cache storage can locate the appropriate cache segment and cache blocks to read from and serve the data to caller.

Figure 11:
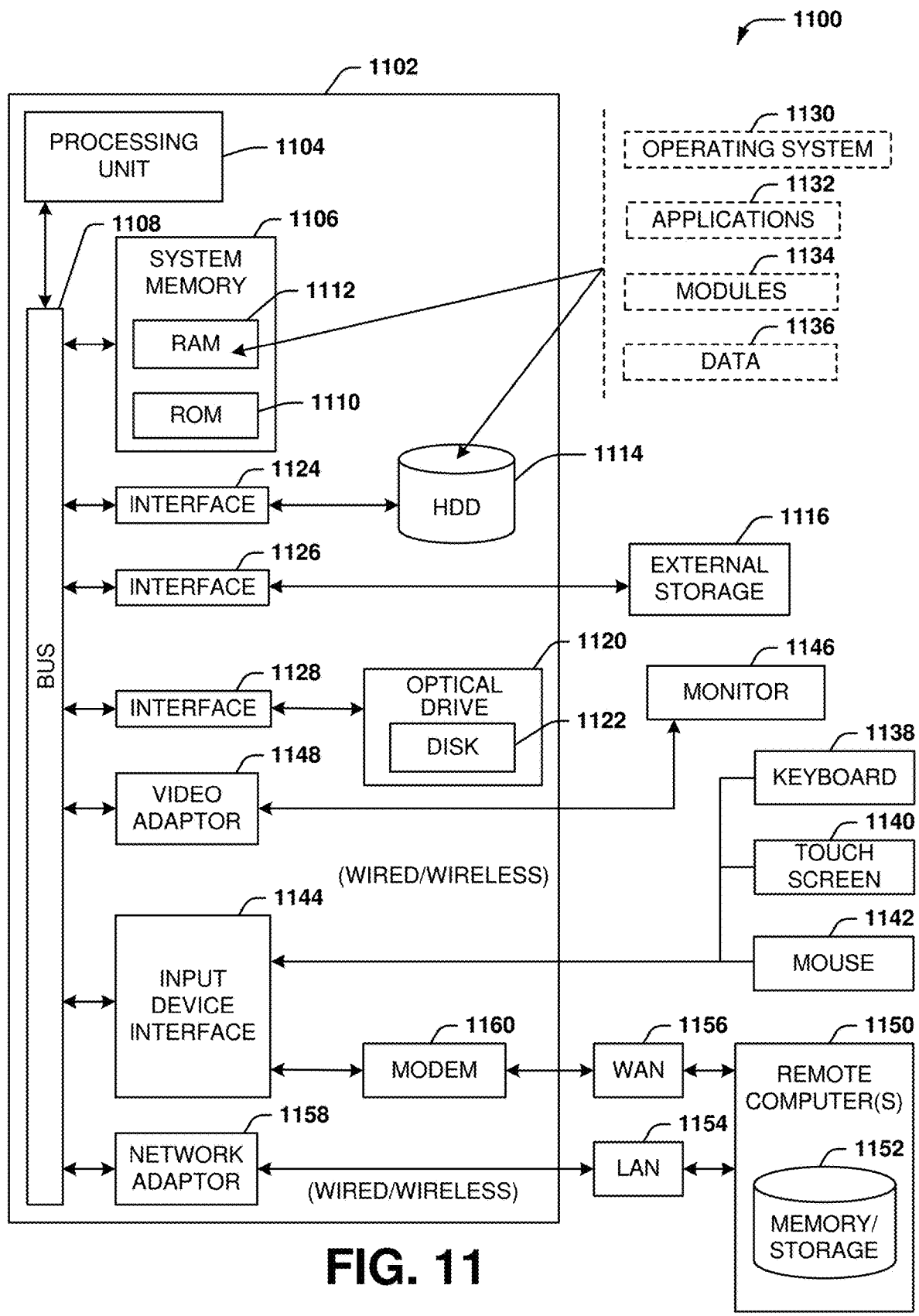
FIG. 11 illustrates a block diagram of an example computer operable to provide device including a cache as described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104. A cache according to this disclosure may generally be implemented in a processing unit 1104 and/or in a system memory 1106, as will be appreciated.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary"

and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   identifying, by a device comprising a processor, a first cache block in a first cache segment of multiple cache segments of a cache storage, wherein each respective cache segment of the multiple cache segments comprises a respective metadata block and multiple respective cache blocks;
   storing, by the device, in the first cache block, a first portion of a cache entry comprising a first portion of a data stream;
   in response to an indication that the first cache block is full, identifying, by the device, a second cache block in the cache storage;
   storing, by the device, in the second cache block, a second portion of the cache entry comprising a second portion of the data stream; and
   storing, by the device, a pointer in the respective metadata block within the respective cache segment comprising the second cache block, wherein the pointer points to the first cache block.

2. The method of claim 1, wherein the multiple cache segments are equal sized and wherein the multiple respective cache blocks are equal sized.

3. The method of claim 1, wherein the respective metadata block within the respective cache segment comprising the second cache block comprises the pointer and an indication that the second cache block is allocated to the cache entry.

4. The method of claim 1, wherein identifying the first cache block in the cache storage comprises checking a cache index for a last used cache block identification, and wherein the method further comprises updating, by the device, the last used cache block identification in the cache index to identify a final cache block comprising a final portion of the cache entry.

5. The method of claim 1, further comprising, in response to an indication that the first cache segment is full, identifying, by the device, a second cache segment in the cache storage, and wherein the second cache block is in the second cache segment.

6. The method of claim 1, further comprising performing, by the device, a cache cleanup in response to an indication that the cache storage is full.

7. The method of claim 1, further comprising outputting, by the device, a cache utilization measurement indicating a proportion of the cache storage which is in use.

8. The method of claim 1, further comprising, in response to the cache entry reaching a size limit, creating, by the device, an additional cache entry to store an additional portion of the data stream.

9. The method of claim 1, further comprising storing, by the device, cache entry index data comprising cache entries and corresponding cache blocks.

10. A device, comprising:
    at least one processor; and
    at least one memory that stores executable instructions that, when executed by the at least one processor, facilitate performance of operations, comprising:
      storing a data stream in a cache storage comprising multiple equal sized cache segments, each cache segment comprising a respective metadata block and multiple equal sized cache blocks,
      wherein the data stream is stored as a cache entry in at least one cache block, the at least one cache block comprising a last used cache block in the cache storage;
      storing cache entry index data comprising:
        a cache entry identifier for the cache entry; and
        a first cache segment identifier and a first cache block identifier for the at least one cache block; and
      reading the cache entry by referencing the cache entry identifier in the cache entry index data, and reading data from the at least one cache block identified by the cache segment identifier and a cache block identifier.

11. The device of claim 10, wherein the at least one cache block further comprises at least one additional cache block in the cache storage, in addition to the last used cache block in the cache storage.

12. The device of claim 11, wherein the operations further comprise identifying a free cache block in a cache segment comprising the last used cache block, and using the free cache block as the at least one additional cache block.

13. The device of claim 11, wherein the operations further comprise, in response to identifying no free cache blocks in a cache segment comprising the last used cache block, identifying an additional cache segment comprising a free cache block, and using the free cache block as the at least one additional cache block.

14. The device of claim 11, wherein the operations further comprise storing a pointer in the respective metadata block for a cache segment comprising the at least one additional cache block, and wherein the pointer points to a previous cache block comprising a previous portion of the cache entry.

15. The device of claim 11, wherein the cache entry index data further comprises a final cache segment identifier and a final cache block identifier for a final cache block of the at least one additional cache block.

16. A non-transitory machine-readable medium, comprising executable instructions that, when executed by a processor, facilitate performance of operations, comprising:
    directing a data stream to a cache storage, the cache storage comprising multiple cache segments, each cache segment comprising a respective metadata block and multiple cache blocks;
    storing the data stream in the multiple cache blocks of the cache storage by serially filling free cache blocks with the data stream;
    in response to identifying a next free cache block for use in the serially filling of the free cache blocks with the data stream, reporting a cache utilization measurement indicating a proportion of the cache storage which is in use; and
    throttling a rate at which the data stream is directed to the cache storage as a function of the cache utilization measurement.

17. The non-transitory machine-readable medium of claim 16, wherein the throttling the rate at which the data stream is directed to the cache storage as a function of the cache utilization measurement comprises setting a throttling delay when the cache utilization measurement is above a throttling threshold.

18. The non-transitory machine-readable medium of claim 16, wherein the operations further comprise evicting one or more previous data streams from the cache storage in response to the cache utilization measurement exceeding an eviction threshold.

19. The non-transitory machine-readable medium of claim 16, wherein the data stream is stored as at least one cache entry in the multiple cache blocks of the cache storage.

20. The non-transitory machine-readable medium of claim 16, wherein the storing the data stream in the multiple cache blocks of the cache storage by the serially filling of the free cache blocks with the data stream comprises serially filling of the free cache blocks of each respective cache segment of the multiple cache segments.

* * * * *